United States Patent
Cui et al.

(10) Patent No.: US 9,303,741 B2
(45) Date of Patent: Apr. 5, 2016

(54) LINEAR-TO-ROTARY ACTUATOR

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 14/099,186

(22) Filed: Dec. 6, 2013

(65) Prior Publication Data
US 2015/0159740 A1    Jun. 11, 2015

(51) Int. Cl.
| | |
|---|---|
| *F16H 25/08* | (2006.01) |
| *F16H 25/16* | (2006.01) |
| *F16H 25/20* | (2006.01) |
| *F16H 25/14* | (2006.01) |
| *E05F 15/611* | (2015.01) |
| *E05F 15/53* | (2015.01) |

(52) U.S. Cl.
CPC .............. *F16H 25/20* (2013.01); *E05F 15/611* (2015.01); *F16H 25/08* (2013.01); *F16H 25/14* (2013.01); *E05F 15/53* (2015.01); *E05Y 2201/638* (2013.01); *Y10T 74/1828* (2015.01); *Y10T 74/18296* (2015.01); *Y10T 74/18576* (2015.01)

(58) Field of Classification Search
CPC ......... F16H 25/14; F16H 53/08; F16H 25/06; F16H 21/28; F16H 25/08; F16H 27/06; F16H 2025/127; Y10T 74/18296; Y10T 74/18056; Y10T 74/2101
USPC ........... 74/25, 39, 53, 54, 55, 62, 88, 89, 107, 74/567, 569
See application file for complete search history.

(56) References Cited

U.S. PATENT DOCUMENTS

| | | | | |
|---|---|---|---|---|
| 1,117,749 | A * | 11/1914 | Adrian | 74/25 |
| 1,979,195 | A * | 10/1934 | Govare et al. | 74/55 |
| 2,528,386 | A * | 10/1950 | Napper | 74/55 |
| 2,871,723 | A * | 2/1959 | Shephard | 74/567 |
| 4,660,431 | A | 4/1987 | Heine | |
| 5,182,927 | A * | 2/1993 | Pernick | 66/54 |
| 5,239,879 | A | 8/1993 | Econonmou | |
| 6,073,503 | A * | 6/2000 | Matsuno et al. | 74/55 |
| 6,333,831 | B1 | 12/2001 | Todd | |
| 6,909,223 | B2 * | 6/2005 | Miyazawa | 310/328 |
| 7,523,761 | B2 * | 4/2009 | Stiehl et al. | 137/398 |
| 2009/0088792 | A1* | 4/2009 | Hoell et al. | 606/206 |
| 2010/0000371 | A1* | 1/2010 | Roser | 74/571.11 |
| 2010/0242919 | A1 | 9/2010 | Oprea | |

FOREIGN PATENT DOCUMENTS

DE    10 2004 053033  B3    12/2005

* cited by examiner

*Primary Examiner* — William Kelleher
*Assistant Examiner* — Jake Cook
(74) *Attorney, Agent, or Firm* — Richard C. Litman (57) ABSTRACT

The linear-to-rotary actuator includes an elongated drive member constrained to linear movement, and a rotary member constrained to rotary movement. The elongated drive member has a coupling end and an engaging member that projects from the coupling end. The rotary member has a track defining an Archimedean spiral. The track is adapted to receive the engaging member. The engaging member is constrained to slide in the track such that linear movement of the elongated member effects rotation of the rotary member. The track may be a slot, a groove, or other guide. Alternatively, instead of a track defined directly in the rotary member, the actuator may include a linking member (such as a disk or rectangular bracket) attached to the rotary member, the linking member having a track defining an Archimedean spiral defined therein, the engaging member being slidable in the track to convert linear motion into rotary motion.

18 Claims, 6 Drawing Sheets

LINEAR-TO-ROTARY ACTUATOR

BACKGROUND OF THE INVENTION

1. Field of the Invention

The present invention relates to mechanical drive mechanisms that convert one type of motion to another, and more particularly, to a linear-to-rotary actuator that uses an Archimedean spiral to convert linear motion of a first member into rotary motion of a second member.

2. Description of the Related Art

Actuators used to facilitate the transfer of linear motion to rotary motion and/or rotary to linear motion between engaging members can vary in complexity, as well as the prescribed use. Door hinges, scissor trimming, raising lift linkages, and the steering of a wheel are all examples that illustrate interconversion between linear and rotary motion. While many types of linear-to-rotary actuators exist, very few actuators have a universal application that can convert linear motion of a first member into rotary motion of a second member, or vice-versa, in an easy and efficient manner.

Another basic example of a type of actuator that translates between linear and rotary motion is a screw fastener. Rotation of the screw head translates to linear movement of the screw. While screw fasteners are widely used in many different mechanical applications, they are not very easy to thread or unthread without the use of specialized tools, such as a screwdriver.

Thus, a linear-to-rotary actuator solving the aforementioned problems is desired.

SUMMARY OF THE INVENTION

The linear-to-rotary actuator includes an elongated drive member constrained to linear movement, and a rotary member constrained to rotary movement. The elongated drive member has a coupling end and an engaging member that projects from the coupling end. The rotary member has a track defining an Archimedean spiral. The track is adapted to receive the engaging member. The engaging member is constrained to slide in the track such that linear movement of the elongated member effects rotation of the rotary member. The track may be a slot, a groove, or other guide. Alternatively, instead of a track defined directly in the rotary member, the actuator may include a linking member (such as a disk or rectangular bracket) attached to the rotary member, the linking member having a track defining an Archimedean spiral defined therein, the engaging member being slidable in the track to convert linear motion into rotary motion.

The elongated drive member may be a linear actuator selected from the group consisting of a hydraulic piston and cylinder assembly, a pneumatic piston and cylinder assembly, and an electric linear actuator. Alternatively, the elongated drive member may be a shaft and a gear assembly for driving the shaft. The gear assembly can be selected from the group consisting of a rack and pinion gear assembly and a worm drive gear assembly. Alternatively, the elongated drive member may be an elongated shaft having a threaded end and a support member having an internally threaded bore. The elongated shaft moves linearly when the threaded end is threaded into and out of the bore in the support member. In another alternative, the linear-to-rotary actuator may have a shaft, an electric motor, and a coupler assembly connecting the motor to the shaft. The coupler assembly selectively reciprocates the shaft. The elongated drive member may comprise a part of any mechanism for imparting linear motion to the elongated drive member.

The rotary member may comprise a door and hinges adapted for connecting the door to a rigid support member. As such, the door is rotatable on the hinges, and linear movement of the elongated member selectively opens and closes the door. Alternatively, the rotary member may be a pivotally mounted arm, post, disk, wheel, shaft, or any other member that can engage in rotary motion.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The embodiments of a linear-to-rotary actuator described herein provide various mechanical devices utilizing an Archimedean spiral configuration provided on the linear-to-rotary actuator to facilitate selective extension, retraction and rotation of connected members with ease of operation.

Figure 1A:
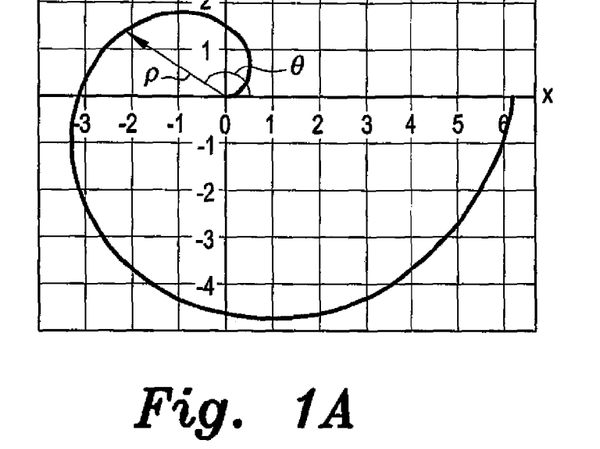
FIG. 1A is a chart illustrating an example of an Archimedean spiral.

Referring to the graph shown FIG. 1A, an Archimedean spiral is characterized by the mathematical formula $\rho = a\theta$, where $\rho$ equals the radius or radial vector from the point of origin O, a equals a constant, and $\theta$ is the angle expressed in radians, $a\theta$ being in polar coordinates. For any given constant a there is a constant proportional relationship between the change in radial length and the change in angle. In other words, any arbitrary point following the above formula will change in radial length at the same proportional constant rate as that of the angular rotation. As used herein, an Archimedean spiral refers to any curve, or portion of a curve, that complies with the formula $\rho = a\theta$, except as specified below.

Figure 1B:
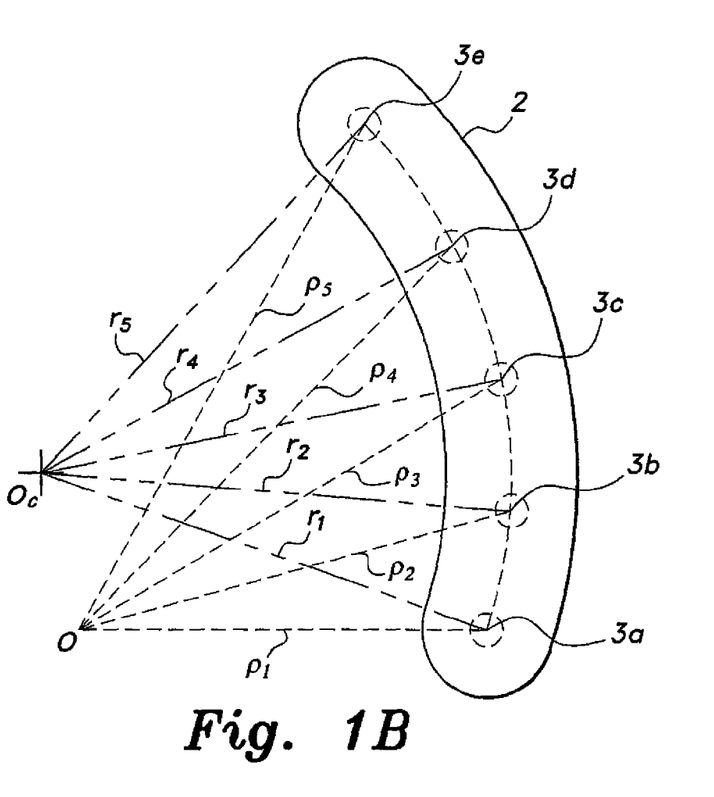
FIG. 1B is a diagram illustrating construction of a guide curve based upon the principles of an Archimedean spiral.

FIG. 1B shows an example of an Archimedean curve constructed in accordance with the principles of the above formula. The curve 2 defines the linear movement of a member, which will be further described in relation to the various embodiments described herein. In this example, it is desired to move the member a certain linear distance starting from an arbitrary initial point 3a to an end point 3e within a desired arc range. The difference between the length of the initial radius $\rho_1$ and the length of the end radius $\rho_5$ equals the length of desired linear movement. The intermediate points 3b, 3c, 3d and the intermediate radial lengths $\rho_2$, $\rho_3$, $\rho_4$ can be determined by dividing the arc range into equal increments. Joining these points 3a, 3b, 3c, 3d, 3e provides a good approximation of the shape of the desired curve 2. Increasing the increments will result in a more accurate curve 2.

Further, the curve 2 can also be approximated by a simple circular curve. As shown in FIG. 1B, the curve 2 can have the properties of a simple circular curve where the axis or point of origin $O_C$ is offset from the original point of origin O. The radii $r_1$, $r_2$, $r_3$, $r_4$, $r_5$ to each respective point 3a, 3b, 3c, 3d, 3e on the curve from the offset point of origin $O_C$ are approximately equal to each other. Thus, it can be seen that an Archimedean spiral can also be expressed by a circular curve. The above concepts provide that a relatively smooth and effortless translational curve can be constructed, especially for linear-to-rotary actuators to transfer linear motion to rotary motion for connected mechanical components.

The aforementioned principles of Archimedean spirals, represented by example in the guide curve 2 of FIG. 1B, can be utilized to efficiently and effectively transfer linear motion to rotary motion in several mechanical applications.

Figure 2:
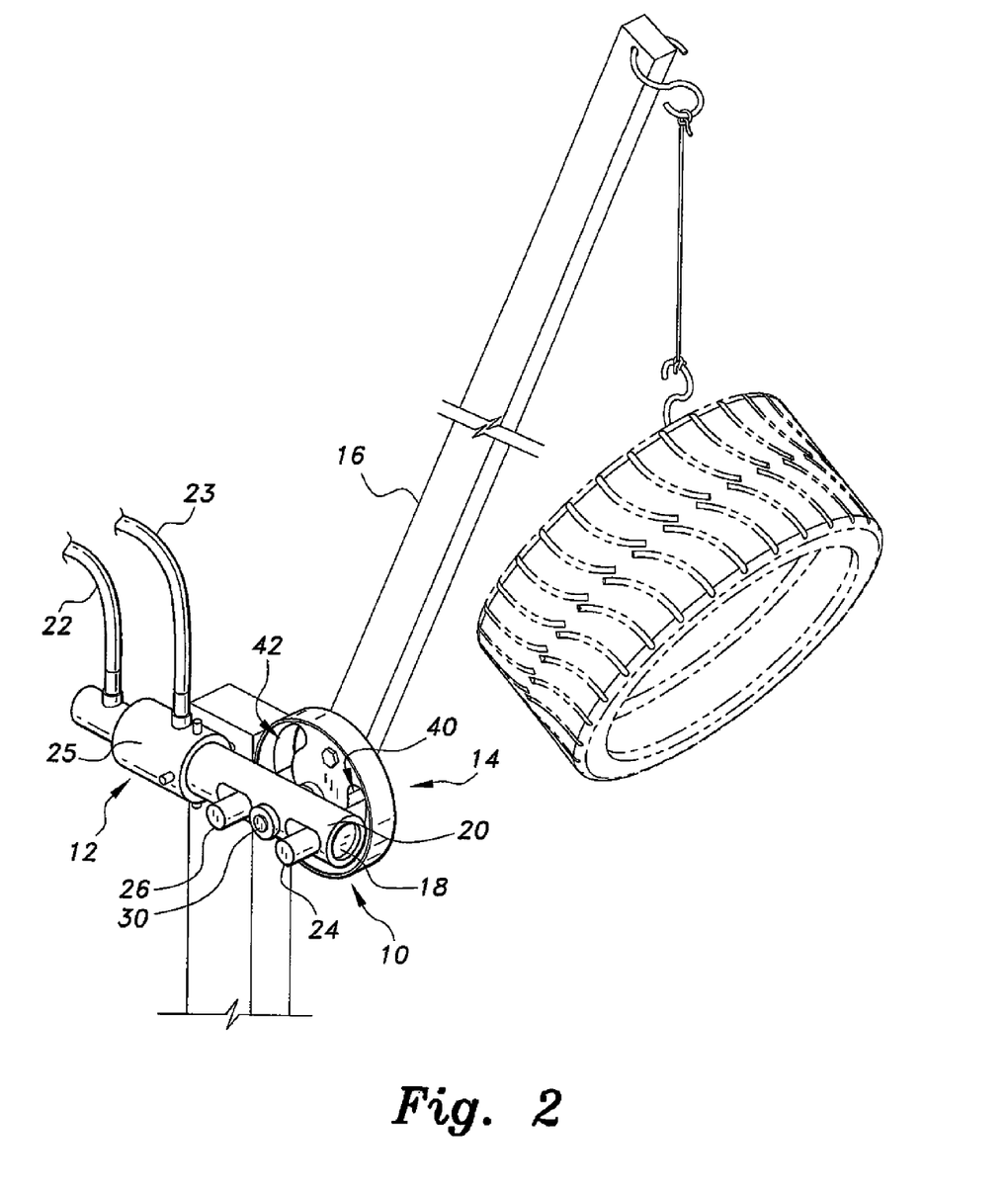
FIG. 2 is an environmental, perspective view of a crane incorporating a linear-to-rotary actuator according to the present invention.

Referring to FIG. 2, there is shown a linear-to-rotary actuator 10 adapted to transfer linear motion into rotary motion in conjunction with a crane. As shown, the actuator 10 includes a first member 12, or elongated drive member, such as a double-acting hydraulic cylinder and piston assembly 12, to provide linear motion. The actuator 10 further includes a second member, or arm 16, adapted for rotary motion, and a linking member or rotary member 14 adapted to transfer linear motion of the first member 12 into rotary motion of the second member 16.

The elongated drive member assembly 12 includes a piston 18. The elongated drive member 12 is configured to extend and retract the piston 18 linearly in response to pressure applied by the control lines 22 and 23. As illustrated, the elongated drive member 12 is constrained in a cylinder 25, which limits the piston 18 to generally linear movement. The elongated drive member 12 further includes a coupling end 20, which includes a first engaging member 24 and a second engaging member 26, projecting from the coupling end 20 and adapted for operative engagement with the rotary member 14.

The rotary member 14 rotates in response to linear movement of the elongated drive member 12 and piston 18. The rotary member 14 operatively engages the elongated drive member 12 and the second member 16, enabling the transfer of linear motion of the elongated drive member 12 into rotary motion of the second member 16. As shown, the rotary member 14 is connected to the first member 12 at a central axis 30. As such, the rotary member 14 rotates about the axis 30, when the elongated drive member 12 and piston 18 move linearly.

As shown, the rotary member 14 has a generally circular configuration conducive for circular rotation about the axis 30. The rotary member 14 includes a first slot or track 40 defining an Archimedean curve, and adapted to receive the corresponding first engaging member 24 of the elongated drive member 12. The rotary member 14 further includes a second slot or track 42, also defining an Archimedean curve, and adapted to receive the corresponding engaging member 26.

Each respective guide slot 40 and 42 is formed in accordance with, or has the curvature defining, an Archimedean spiral, as previously described in FIG. 1B. Accordingly, upon linear movement of the piston 18 of the elongated drive member 12, each respective guide 40 and 42 translate linear movement of the respective engaging member 24, 26 into rotary movement of the rotary member 14 and the connected second member 16.

In operation, the elongated drive member 12 is activated by the control lines 22 and 23. As such, hydraulic pressure forces the piston 18 to extend linearly outward from the hydraulic cylinder 12. As the elongated member 18 moves linearly, the engaging members 24 and 26, positioned in the corresponding respective guides 40 and 42, provide a force on the rotary member 14. As such, the respective engaging members 24, and 26 slide along the guides 40 and 42.

As the engaging members 24 and 26 cooperatively travel along the Archimedean shaped guides 40, 42, linear forces are applied to the rotary member 14, thereby rotating the rotary member 14 about the axis 30, and further cooperatively rotating the connected second member 16. Linear retraction of the elongated drive member 18 towards the hydraulic cylinder 25 has a reverse effect on the rotary member 14. As such, linear retraction of the elongated drive member 14 forces the rotary member 14 and connected second member 16 to rotate in an opposite direction.

Figure 3:
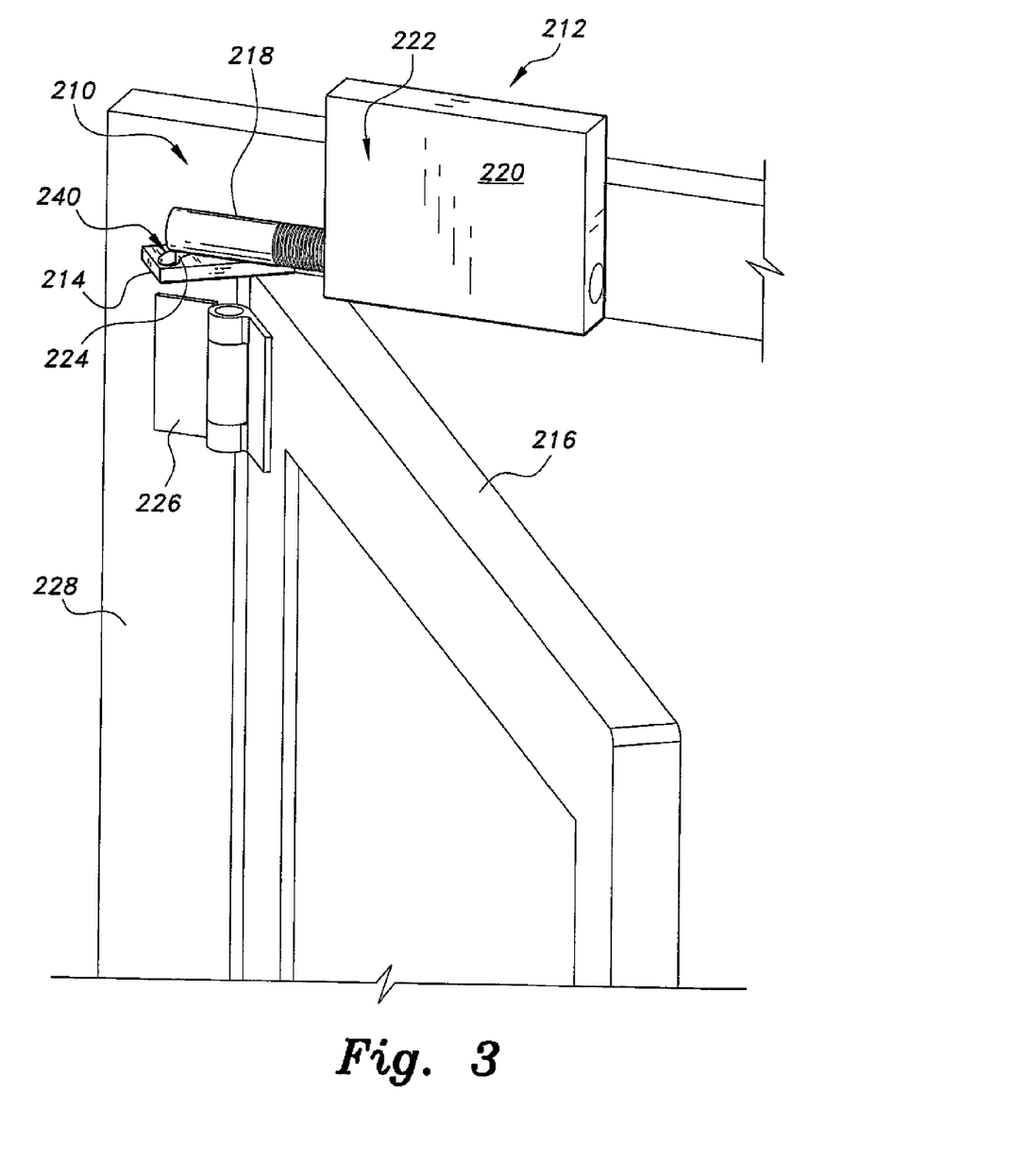
FIG. 3 is a partial environmental perspective view of door incorporating a linear-to-rotary actuator according to the present invention.

Referring now to FIG. 3, there is shown an embodiment of the linear-to-rotary actuator 210 using a slot 240 defining an Archimedean curve to transfer linear motion into rotary motion of a door or window. As shown, the actuator 210 includes a first member 212 or elongated drive member, a linking member 214 having a track or slot 240 formed therein, and a second member 216, in operative engagement with the joining member 214 and elongated drive member 212.

The elongated drive member 212 can include a gear assembly or coupler assembly 220. The assembly 220 provides the actuator with a linear driving force. The gear assembly 220 can be a worm drive gear assembly 220, including an electric linear actuator, having a motor 222 and a shaft 218. The assembly 220 connects the motor 222 to the shaft 218, and selectively reciprocates the shaft 218 linearly.

As shown, the shaft 218 has a threaded end. The assembly 220 or member 220 has an internally threaded bore for receiving the shaft 218. The shaft 218 is adapted for linear movement into and out of the internally threaded bore formed in the assembly 220. Linear movement is applied to the shaft 218, when the threaded end of the shaft 218 is threaded into and out of the bore formed in the support member 220.

As shown the linking member 214 can be a plate or bracket having a non-circular configuration. The linking member 214 is connected to the second member 216, which can be a door or window 216. The linking member 214 further includes a track or slot 240 formed therein defining an Archimedean spiral. As shown the slot 240 is adapted to receive the engaging member 224 of the shaft 218. As the engaging member 224 is constrained to slide in the slot 240, linear movement of the shaft 218 can rotate the linking member 214 and connected second member 216.

As illustrated, the second member 216, which can be a door or window, is further connected to a hinge 226 and frame 228, enabling the second member 216 to rotate in response to movement of the joining member 214.

In operation, a remote control or user interface can activate the electric motor 222 to force the threaded shaft 218 to move in linearly. As the shaft 218 moves linearly, the engaging member 224 slides along the Archimedean slot 240. Linear movement of the engaging member 224 within the Archimedean slot 240 forces the linking member 214 to rotate. Accordingly, the member 216, connected to the plate 214, is forced to also rotate relative to the frame 228.

With respect to singular rotary members, the driving torque applied on a singular rotary member having an Archimedean spiral varies from the radius change of the rotating angle. The varied torque applied to the member can negatively affect the dynamic application to the linear to actuator. Accordingly it is desirable, when transferring linear motion to rotary motion, that the linear-to-rotary actuator has constant torque.

Figure 4A:
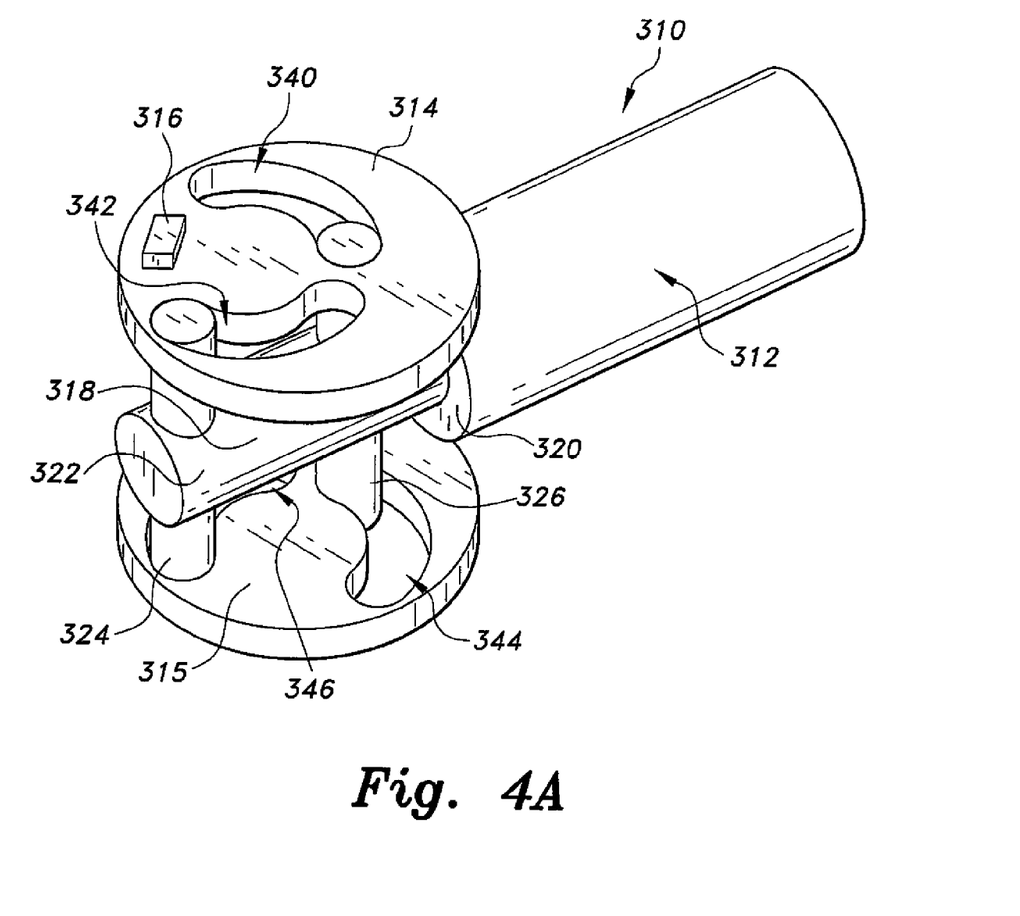
FIG. 4A is a perspective view of a linear-to-rotary actuator according to the present invention having a pair of rotary members on opposite sides of a linearly movable shaft to provide constant torque.
Figure 4B:
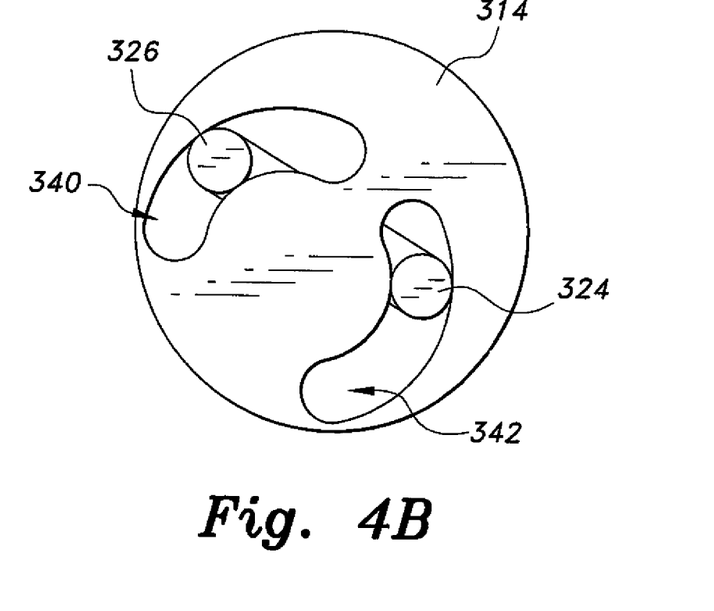
FIG. 4B is a side view of a disk-type rotary member of the linear-to-rotary actuator of FIG. 4A.
Figure 4C:
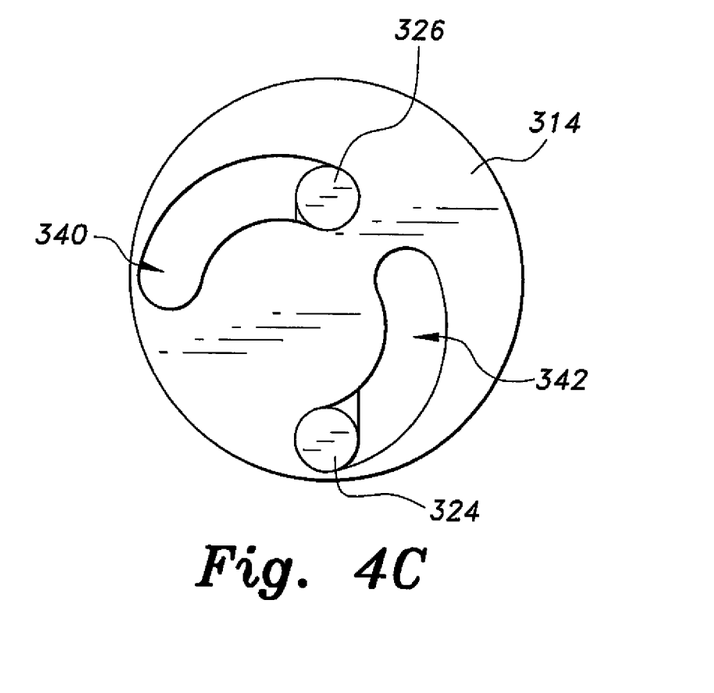
FIG. 4C is a side view of the disk-type rotary member of FIG. 4B, shown rotated to the stops of the tracks.

Referring now to FIGS. 4A-4C, there is shown an embodiment of a linear-to-rotary actuator 310 adapted to provide constant torque during linear-to-rotary motion transfer. The actuator 310 includes a first member 312, or elongated drive member 312, a rotary member 314, 315, and a rotary member 316 adapted to transfer rotary motion to an associated member.

The elongated drive member 312 can include a cylinder and piston assembly 320, or pneumatic and piston assembly 320. As illustrated the piston assembly 320 includes a cylinder and piston 318. The piston 318 has a coupling end 322, which includes plural engaging members 324 and 326 configured for operative engagement with the rotary members 314 and 315. The rotary members 314 and 315 transfer linear motion from the first member 312 into rotary motion of the second member 316.

FIG. 4A shows the rotary actuator 310. As shown, the first member 312 can be a cylinder and piston assembly 320. The piston 318 is adapted for linear reciprocation. The elongated drive member 312 includes plural engaging members 324, and 326 formed on a coupling end 322 and adapted to cooperatively engage rotary members 314, 315 to enable the transfer of linear motion of the piston 318 into rotary motion of the rotary members 314, 315.

As illustrated, the rotary member 314 includes dual slots, or tracks 340, 342 and the rotary member 315 includes dual slots or tracks 344 and 346 formed therein. The tracks 340, 342, 344 and 346 define an Archimedean curve, similar to the curve illustrated in FIG. 1B. The engaging members 324 and 326 each have two opposing ends that project from the piston 318. As such, the engaging members 324 and 326 provide four insertable members configured for entry into the corresponding Archimedean slots 340, 342, 344 and 346.

As illustrated in FIGS. 4B and 4C, the respective Archimedean curves 340 and 342 are symmetrically arrayed about the center of the rotary member 314. The plural grooves 340, 342 balance the torque change to the constant. As such the driving arm or piston 318 when moving in the constant length of linear motion can drive the symmetric Archimedean grooves 340, 342 simultaneously and keep the driving torque constant.

As shown in FIG. 4A, the rotary or rotary members 314, and 315 with an Archimedean groove formed therein can have reverse rotations installed on opposing sides of the engaging members 324 and 326. It is contemplated that the rotary members 314 and 315 do not be need to be identical. The Archimedean spirals on each side can have different constant in $\rho = a\theta$. They will be matched in motion if and only they follow the same linear motion step with the angular motion different. Notably, it is possible to form the Archimedean slots 340, 342 on a single disc 180° or less, and by using dual rotary members 314, 315, the relative angle of change can be doubled to about 360° or less.

In operation, the elongated drive member 312 selectively receives hydraulic or pneumatic pressure in the cylinder, and pressure is applied to the piston 318. The piston 318 is constrained to reciprocate linearly. The engaging members 324 and 326, in response to movement of the connected piston 318, move linearly. As such, the engaging members 324 and 326 are constrained to slide along the respective Archimedean slots 340, 342, 344, and 346, so that the rotary members 314, 315 rotate.

Figure 5:
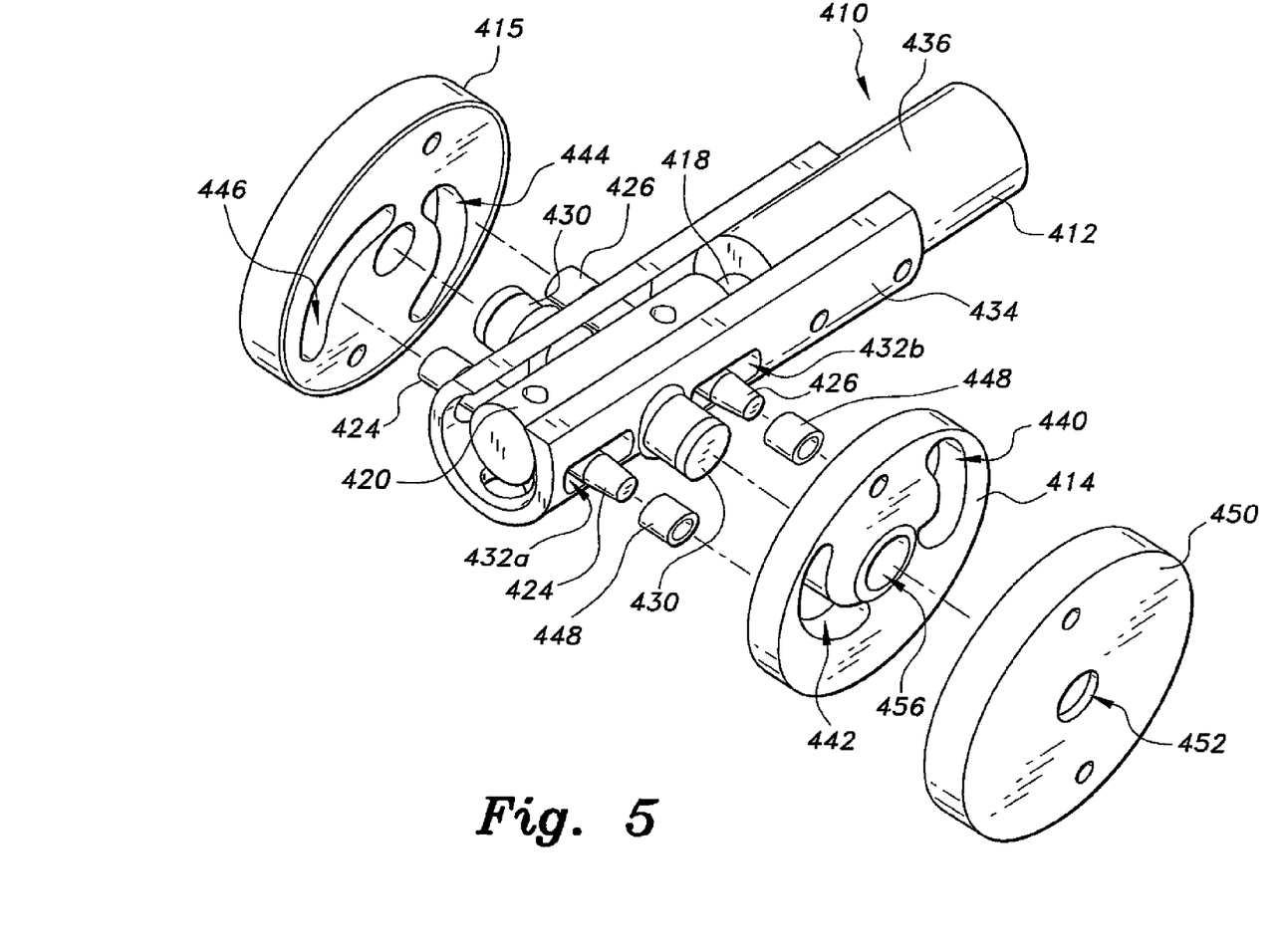
FIG. 5 is an exploded view of an embodiment of a linear-to-rotary actuator according to the present invention having dual rotating members with dual slots defining Archimedean spirals to provide constant torque.

Continuing to FIG. 5, an embodiment of a fluid-driven linear-to-rotary actuator 410 is shown for transferring linear motion of a first member 412 or elongated drive member 412 into rotary motion of one or more second members, or rotary members 414, 415. The linear-to-rotary actuator 410 can use hydraulic pressure or pneumatic pressure to provide a driving forced from the linear-to-rotary actuator 410. As such, it is contemplated that the elongated drive member 412, of the linear-to-rotary actuator 410 can be a hydraulic piston and cylinder assembly, or a pneumatic piston and cylinder assembly.

The elongated drive member 412 includes a cylinder 436, a piston 418, operatively connected to the cylinder 436, and a sleeve 434. The elongated drive member 412 further includes an extension bar 420 defining a coupling end 420. The extension bar 420 is connected to the piston 418 and configured for reciprocation within the sleeve 434. The elongated drive member 212 further includes a plurality of cross pins or engaging members 424 and 426 extending generally outward from the extension bar 420, and adapted to cooperatively engage the rotary members 414, 415.

The sleeve 434 includes a plurality of slots or apertures 432a, 432b formed therein. The plural slots 432a, 432b are adapted to receive corresponding plural engaging members 424 and 426 through the sleeve 434. The slots 432a and 432b enable linear movement of the engaging members 424 and 426 during operation, and also enable the engaging members 424 and 426 to be operatively engaged with the corresponding rotary members 414 and 415.

The engaging members 424, 426 include corresponding rollers 448, adapted for connection to the ends of the respective engaging members 424, 426 to facilitate sliding movement of the engaging members 424, 426 during linear engagement with the rotary members 414, 415.

As shown, the dual rotary members 415, 414 pivotally engage the axis 430 on both respective sides of the elongated driving member 412. The rotary members 414, 415 have a generally circular configuration, and each includes dual tracks, tracks 440, 442 for rotary member 414, and dual tracks 444, 446 for rotary member 415 to receive respective engaging members 424 and 426. The tracks 440, 442 and 444, 446 each have an Archimedean curve formation to cooperatively provide a balanced and constant driving torque when in rotary motion. As shown, Archimedean tracks 440, 442 are formed in opposing directions from tracks 444, 446 such that torque applied by the rotary members 414 and 415 to the connected members is balanced.

In operation, the elongated drive member 412 selectively receives hydraulic or pneumatic pressure in the cylinder 436. The pressure is applied the piston 418 forcing the piston 418 to reciprocate linearly within the sleeve 434. The connected extension bar 420, in response to movement of the piston 418, moves linearly within sleeve 434. As such, the engaging member 424 and 426 engage the rotary members 414 and 415, and are constrained to slide along the respective Archimedean slots 440, 442, 444. Accordingly, the rotary members 414, and 415 rotate about the axis 430 to transfer linear motion into rotary motion.

Other embodiments are contemplated with respect to using the Archimedean spiral for linear-to-rotary actuators. For example, with respect to safety applications, a linear-to-rotary actuator may have a block including an Archimedean groove. In such application, a sliding bar has an engaging member provided on an end thereof. As force is provided downward, the engaging member provides a force rotating the block in a downward position. As the sliding bar with spring forces extends upward, a linear force rotates the block upward.

In another embodiment, relative rotation angle enlargement for the Archimedean rotator can be used to drive a four-bar linkage system. As such, a pair of identical non-circular shaped rotary members, or Archimedean brackets, are jointly provided on the same sides of the first member or sliding member. As the sliding member with threads are driven by manual crank or motors, the vertical bar with crossed rollers in the identical Archimedean slots will lift up and down the linkages. The relative rotating angles between the upper and lower linkages are doubled as the single Archimedean angle rotated. Moreover, the relative linkage position is automatically self-locked in thread movement.

It is to be understood that the present invention is not limited to the embodiments described above, but encompasses any and all embodiments within the scope of the following claims.

We claim:

1. A linear-to-rotary actuator, comprising:
    an elongated driver member constrained to linear movement, the elongated driver member having a coupling end;
    an engaging member projecting from the coupling end of the elongated driver member; and
    a rotary driven member constrained to rotary movement, the rotary driven member having a track defining an Archimedean spiral, the engaging member being constrained to slide in the track;
    wherein linear movement of the elongated driver member rotates the rotary driven member.

2. The linear-to-rotary actuator according to claim 1, wherein the track is a slot.

3. The linear-to-rotary actuator according to claim 1, wherein the track comprises a groove.

4. The linear-to-rotary actuator according to claim 1, wherein the elongated driver member comprises a linear actuator selected from the group consisting of a hydraulic piston and cylinder assembly, a pneumatic piston and cylinder assembly, and an electric linear actuator.

5. The linear-to-rotary actuator according to claim 1, wherein the elongated driver member comprises a shaft and a gear assembly driving the shaft, the gear assembly being selected from the group consisting of a rack and pinion gear assembly and a worm drive gear assembly.

6. The linear-to-rotary actuator according to claim 1, wherein the elongated driver member comprises an elongated shaft having a threaded end and a support member having an internally threaded bore, the elongated shaft moving linearly when the threaded end is threaded into and out of the bore in the support member.

7. The linear-to-rotary actuator according to claim 1, wherein the elongated driver member comprises a shaft, an electric motor, and a coupler assembly connecting the motor to the shaft, the coupler assembly selectively reciprocating the shaft.

8. The linear-to-rotary actuator according to claim 1, wherein the rotary driven member comprises door and hinges adapted for connecting the door to a rigid support member, the door being rotatable on the hinges, wherein linear movement of the elongated driver member selectively opens and closes the door.

9. A linear-to-rotary actuator, comprising:
    an elongated driver member constrained to linear movement, the elongated driver member having a coupling end;
    an engaging member projecting from the coupling end of the elongated driver member;
    a rotary driven member constrained to rotary movement; and
    a linking member attached to the rotary driven member, the linking member having a track defining an Archimedean spiral, the engaging member being constrained to slide in the track;
    wherein linear movement of the elongated driver member rotates the rotary member.

10. The linear-to-rotary actuator according to claim 9, wherein the track is a slot.

11. The linear-to-rotary actuator according to claim 9, wherein the track comprises a groove.

12. The linear-to-rotary actuator according to claim 9, wherein the elongated driver member comprises a linear actuator selected from the group consisting of a hydraulic piston and cylinder assembly, a pneumatic piston and cylinder assembly, and an electric linear actuator.

13. The linear-to-rotary actuator according to claim 9, wherein the elongated driver member comprises a shaft and a gear assembly driving the shaft, the gear assembly being selected from the group consisting of a rack and pinion gear assembly and a worm drive gear assembly.

14. The linear-to-rotary actuator according to claim 9, wherein the elongated driver member comprises an elongated shaft having a threaded end and a support member having an internally threaded bore, the elongated shaft moving linearly when the threaded end is threaded into and out of the bore in the support member.

15. The linear-to-rotary actuator according to claim 9, wherein the elongated driver member comprises a shaft, an electric motor, and a coupler assembly connecting the motor to the shaft, the coupler assembly selectively reciprocating the shaft.

16. The linear-to-rotary actuator according to claim 9, wherein the linking member comprises a disk.

17. The linear-to-rotary actuator according to claim 9, wherein the linking member comprises a rectangular bracket.

18. The linear-to-rotary actuator according to claim 9, wherein the rotary driven member comprises a door and hinges adapted for connecting the door to a rigid support member, the door being rotatable on the hinges, wherein linear movement of the elongated driver member selectively opens and closes the door.

* * * * *